United States Patent Office 2,943,025
Patented June 28, 1960

2,943,025

PREPARATION OF SPIRAMYCIN II

Léon Ninet, Paris, and Jean Verrier, Boulogne-sur-Seine, France, assignors to Societe des Usines Chimiques Rhone-Poulenc, Paris, France, a French body corporate No Drawing. Original application Apr. 11, 1958, Ser. No. 727,765. Divided and this application May 4, 1959, Ser. No. 810,599

Claims priority, application France Apr. 19, 1957

16 Claims. (Cl. 195—80)

This invention relates to an improved process for the preparation of the antibiotics known as spiramycins II and III, the therapeutic activity of which, in human therapy, is verified in the file of application Serial No. 558,753, filed January 12, 1956.

Spiramycin, an antibiotic composed of three constituents of very similar properties respectively known as spiramycin I, II and III is produced by the culture of a strain of *Streptomyces ambofaciens*, a specimen of which has been deposited at the NRRL Peoria, Illinois, United States of America, where it has been given the designation NRRL 2420, or one of its mutants, in the appropriate culture medium. The organism is identified as "*Streptomyces ambofaciens* NRRL 2420."

The exact constitution of these spiramycins is still not known with certainty but it has been found that spiramycins II and III are respectively the acetyl and propionyl derivatives of spiramycin I. Spiramycins II and III can be crystallised, which facilitates their purification and constitutes an important advantage in their pharmaceutical use.

An important advantage of spiramycins II and III is their lower toxicity as compared with spiramycin I. This is shown in the following table of the doses (expressed in g./kg.) of the three spiramycins which produce a 5% mortality rate in mice treated by the subcutaneous route ($LD_{50}$ g./kg. s.c.).

| Products | $LD_{50}$ (g./kg. s.c.) |
|---|---|
| Spiramycin I | 1.01 |
| Spiramycin II | 1.52 |
| Spiramycin III | 2.04 |

The antimicrobial activity in vitro and in vivo of spiramycins II and III is at least equal to that of spiramycin I.

By employing special fermentation conditions, notably by modification in the composition of the culture medium, it is possible to affect the proportion of the three spiramycins present in the product produced by *Streptomyces ambofaciens* NRRL 2420. Nevertheless with the usual media used for the preparation of spiramycins, which are media based on ill-defined and complex substances or purely synthetic media, the spiramycin I content of the spiramycin produced remains rather high. As a result it is very difficult to obtain spiramycins II and III free from spiramycin I otherwise than in rather poor yields.

It has been discovered, and this forms the basis of the present invention, that by operating under suitable conditions it is possible to direct the fermentation of *Streptomyces ambofaciens* NRRL 2420 or its mutants in such a way that there is obtained a considerable increase in the relative amounts of spiramycin II and/or spiramycin III in the total spiramycin produced by the microorganism. In the case of spiramycin III, for example, a proportion of 75 to 80% by weight of the total spiramycin may be obtained as spiramycin III. It has also been found that *Streptomyces ambofaciens* NRRL 2420 or its mutants are capable of converting spiramycin I into spiramycins II and III by an enzymatic acetylation or propionylation in this way the transformation of spiramycin I can be completed under the best conditions.

According to the present invention a process for the production of spiramycin II or spiramycin III or mixtures thereof comprises culturing *Streptomyces ambofaciens* NRRL 2420 under aerobic conditions on a nutrient culture medium in the presence of an acetylating or propionylating agent or precursor therefor added to the medium. The culture may be carried out on nutrient media known per se or on nutrient media already containing spiramycin I.

As acetylating agents there may be used acetic acid, its salts, e.g. its alkali metal salts, its esters or acetamide. There may also be used compounds which under the conditions of the culture generate an acetylating agent for example butyric acid and its derivatives. Such a compound is hereinafter referred to as a "precursor." For reasons of convenience it is preferred to employ acetic acid or sodium acetate at a concentration of between 0.1 and 30 g. per litre in the medium.

As propionylating agent there may be used propionic acid, its salts, e.g. its alkali metal salts, its esters, propionamide or propanol. There may also be used precursor compounds which under the conditions of the culture generate a propionylating agent, e.g. valeric acid and its salts. For reasons of convenience it is preferred to employ propionic acid or its salts or propionamide at a concentration between 0.1 and 30 g. per litre in the medium, the optimum concentration being in the region of 2–15 g. per litre. The acylating agent can be added as an aqueous solution or a solution in an organic solvent such as methanol, ethanol, acetone, benzene, diethyl ether or dichlorethane. The acylating agent may if desired be added in successive small quantities without producing any important modifications in the desired transformation.

In the usual complex or synthetic media the fermentation does not present any difficulties and proceeds normally.

Where a medium containing spiramycin I is employed it is desirable to take account of the different factors which favour biochemical transformation of spiramycin I into spiramycins II and III. It is necessary for best results to cultivate *Streptomyces ambofaciens* NRRL 2420 in conditions which permit at the same time development and the cultivation of the enzymatic system. Further, it is convenient to utilise the transforming capacity acquired by the culture by employing it as an inoculum medium for addition to media containing spiramycin I.

Thus *Streptomyces ambofaciens* NRRL 2420 can be cultivated in a culture medium containing initially the spiramycin I to be transformed as well as all the necessary factors for the production of the enzymatic system and for the transformation, by the system, of the spiramycin I present into spiramycins II and III. It has however been found particularly advantageous in carrying out the present invention first to cultivate *Streptomyces ambofaciens* NRRL 2420 under conditions such that it produces the acylating enzymatic system and then, as a second step, to utilise the transforming capacity acquired by the organism by putting its mycelium into contact with spiramycin I and the necessary elements for the transformation, i.e. substances capable of producing acetyl or propionyl radicals, and activators.

The culture of *Streptomyces ambofaciens* NRRL 2420 with a view to the production of an acylating enzymatic system can be carried out on very diverse media, in particular on the media which are usually used i.e. complex media or synthetic media. However the quantity and quality of the acylating enzymatic system can be varied over a wide range according to the compositions of the media used. Also, in order to obtain a mycelium possessing a high capacity for transforming spiramycin I into spiramycins II and III, it is preferable to select very carefully the various products entering into the composition of the medium.

It has been found particularly advantageous to use a synthetic medium containing only a glucidic source of energy, a source of ammoniacal nitrogen and neutralising substances. Preferably glucose or starch is used in amounts varying from 1 to 100 g./l., the optimum being between 40 and 60 g./l. Among the ammonium salts, the chloride, sulphate or nitrate are preferred. The quantity of ammoniacal nitrogen can be varied between 0.1 and 10 g./l., the optimum being between 2 and 4 g./l.

The initial pH of the culture of *Streptomyces ambofaciens* NRRL 2420 should be adjusted to between 5 and 9 and preferably between 6.5 and 7.5 in order to achieve a product of high activity in the transformation of spiramycin I.

To avoid change of pH of the culture medium to values which are too low and which may inhibit a high yield of the enzymatic acylating system it is convenient to add to the culture medium neutralising substances in adequate quantity to maintain the pH at the desired value. For this purpose there may be used alkaline agents such as alkali and alkaline earth metal hydroxides and carbonates in solution or suspension in water. It is also possible to add, before the commencement of the culture operation, a potential neutralising substance such as an insoluble carbonate of an alkaline earth metal. Preferably calcium carbonate is used in amounts between 1 and 50 g./l., the optimum amount being about 25 g./l.

It is similarly preferred to cultivate *Streptomyces ambofaciens* NRRL 2420 under well-defined temperature conditions in order to obtain the maximum production of the acylating enzymatic system. The culture can for example be carried out between 15 and 40° C. and preferably between 23–27° C. The culture of *Streptomyces ambofaciens* NRRL 2420 can be carried out under the usual conditions required for aerobic fermentation and more especially in apparatus which allows both a good dispersion of the air necessary for the respiration of streptomyces and a good homogenisation of the culture.

It has been found that the transforming capacity of the *Streptomyces ambofaciens* NRRL 2420 cultures varies with the age of the culture. At the beginning of culturing the transforming capacity is practically proportional to the quantity of mycelium present in the cultures. After a certain time the transformation capacity attains a maximum value and then decreases, while the mycelium continues its growth. In practice it has been found that the mycelium possesses the maximum transformation capacity after 30–150 hours of culture, more often between 40 and 100 hours, the optimum time depending essentially upon the general conditions of the culture.

After having prepared, as will be described, a culture of *Streptomyces ambofaciens* NRRL 2420 or one of its mutants, in order to produce the enzymatic acylating system which converts spiramycin I into spiramycins II and III it is then necessary to place the culture in conditions which will utilise its transforming capacity. There can be added to the culture obtained both the spiramycin I to be transformed and the necessary elements for the transformation, i.e. the acylating agents and activators. The mycelium of *Streptomyces ambofaciens* NRRL 2420 can also be isolated and placed in a suitable transforming medium containing spiramycin I, the acylating agents and activators.

It has been found that the proportion of transformation products of spiramycin I obtained varies according to the nature of the acyl radicals present in the transforming medium. Thus propionyl radicals are attached more easily to the spiramycin I than acetyl radicals. Each time that the two types of radicals are simultaneously present in the transformation medium there is a preferential utilisation of the propionyl radicals to convert spiramycin I to spiramycin III. Thus the transformation of spiramycin I into spiramycin III can be facilitated by the use of substances capable of supplying an excess of propionyl radical. The specific transformation of spiramycin I to spiramycin II only occurs in the absence from the transforming medium of all substances capable of supplying the propionyl radical. Since *Streptomyces ambofaciens* NRRL 2420 produces, with very great ease and in the widest range of media, substances capable of supplying a propionyl radical, the specific transformation of spiramycin I exclusively to spiramycin II can only be carried out under controlled conditions.

If the cultures produced in order to support the acylating system are used directly as transformation media, practically pure spiramycin III is then obtained by the addition of a propionylating agent. But by the addition of an acetylating agent spiramycin I is only converted into a mixture of spiramycins II and III because of the presence in the medium of small quantities of propionylating agent.

However, if the mycelium of the *Streptomyces ambofaciens* NRRL 2420 culture is separated from the medium which has been used to produce the enzymatic acylating system, it is then possible to effect a close control over the transformation of spiramycin I. It is sufficient in effect to add to the mycelium, in addition to the optional activators, the substances capable of supplying acyl radicals. According to the nature of the latter, spiramycin II, spiramycin III or a mixture of the two is then obtained. This process is particularly advantageous for the production of spiramycin II, which can only be obtained in the presence of substances capable of supplying acetyl radicals to the exclusion of substances capable of supplying propionyl radicals, particularly those which arise from metabolism of *Streptomyces ambofaciens* NRRL 2420.

Spiramycin I can be used in the pure state or in a mixture with spiramycins II and III. Such a mixture is obtained by the usual processes of production of crude spiramycin. The spiramycin can be used in the form of the base or a salt and added to the transformation medium in solid or dissolved state. For ease of manipulation spiramycin can be used, for example, in the form of the base dissolved in water, methanol, ethanol, diethyl ether, acetone, benzene or dichlorethane. It can also be used as a salt, more especially the hydrochloride, sulphate, acetate or propionate in aqueous solution.

It is preferable that the concentration of the solutions of spiramycin added to the transforming medium should be such that there is no substantial dilution of the latter medium. The final concentration of the spiramycin I in the transforming medium may be varied, for example, between 1 and 50 g./l. but it is particularly advantageous to use a concentration of spiramycin I between 5 and 20 g./l. This concentration can be obtained by a single addition of spiramycin I or by the addition of several fractions without producing important variations in the desired transformation product.

As a result of the preceding considerations it will be appreciated that a culture of *Streptomyces ambofaciens* NRRL 2420 possessing an enzymatic acylating system with the optional addition of acylating agents, can by itself produce the enzymatic transformation of spiramycin I which is the object of the present invention.

The addition of mineral or organic salts does not usually lead to any important variation in the quantity of spiramycin I transformed. Nevertheless it has been found that certain anions and cations have a favourable effect on the transformation of spiramycin I into spiramycins II and III, either by accelerating the transformation or by increasing the quantity of spiramycin converted.

Among the anions possessing activating properties in the enzymatic reaction is chlorine, which may be added in the form of alkali or alkaline earth metal chlorides or as other metal chlorides provided that the metal present does not inhibit the transformation. The quantity of chlorine added to the medium in the form of the chloride may be between 0.1 and 20 g./l., the optimum quantity being about 1 to 3 g./l.

Among cations which are capable of activating the transformation are magnesium, iron and cobalt, this last being the activator of choice for the enzymatic acylating reaction. These metals can be added in the form of chloride, sulphate, nitrate or any other salts which do not hinder the enzymatic reaction. Thus, for example, magnesium and iron can be used in amounts between 0.1 and 500 mg. per litre in the transforming medium, the optimum being between 5 and 10 mg./l. Cobalt can be used, for example, in amounts between 0.1 and 1000 mg./l. the optimum being between 10 and 400 mg./l.

In order to effect the transformation of spiramycin I into spiramycins II and III under the best possible conditions it is therefore necessary to add to the culture of Streptomyces ambofaciens NRRL 2420 possessing the enzymatic acylating system, the spiramycin I to be transformed, acylating agents and activators as aforesaid.

These different elements can be added simultaneously or separated in time. It is nevertheless preferable to add the spiramycin I after the acylating agents and activators.

It has been found advantageous in certain cases to add, at the same time as spiramycin I the acylating agents and activators, a source of energy such as glucose or starch. This is of importance especially where the mycelium of Streptomyces ambofaciens NRRL 2420 is separated from its culture medium and is placed in a medium containing only spiramycin, acylating agents and activators. Thus, for example, glucose or starch may be added in a quantity between 1 and 50 g./l., the optimum being about 10 g./l.

When the culture containing the enzymatic acylating system is itself used as the transforming medium the addition of the different elements is preferably effected at a pH between 5 and 8 and most advantageously between 6 and 7. It is sometimes desirable, in order to carry out the transformation under the best possible conditions, to modify the pH of the culture at the moment of addition of the various elements. To this end acid or alkaline substances can be used which have substantially no inhibiting properties on the transformation reaction. For example, hydrochloric, sulphuric, nitric, acetic, propionic or citric acids or sodium, potassium, ammonium, calcium or barium hydroxides may be used.

When the transformation is carried out by separating the mycelium of Streptomyces ambofaciens NRRL 2420 from the medium and placing the mycelium in the presence of spiramycin, acylating agents, activators and sources of energy, it is advantageous to regulate the pH between 3 and 8 with the aid of acidic or basic agents as just described. The pH can also be regulated with the aid of buffering media such as acetic acid-acetate, propionic acid-propionate, citric acid-citrate and phthalic acid-phthalate mixtures.

In addition, whatever mode of transformation is selected, it may be advantageous to correct the variations in pH which are produced in the course of the transformation by addition of acidic or basic agents or buffering mixtures.

The transformation of spiramycin I into spiramycins II and III by Streptomyces ambofaciens NRRL 2420 continues while the culture of this organism is maintained in perfectly aerobic conditions whichever of the foregoing methods is employed. It is necessary therefore, after the addition of the different elements, to maintain the transforming medium under conditions of aeration and agitation similar to those used for the initial culture.

The temperature at which the enzymatic acylating transformation is carried out is not very critical. Generally a temperature between 15 and 40° C. will be used, the optimum being in the region of 25° C.

The transformation of spiramycin I into spiramycins II and III is a relatively rapid transformation and a large proportion of spiramycin I is transformed in 24 hours. In order to obtain the maximum transformation yield it is desirable to maintain a sufficiently long contact between the enzymatic acylating system, the spiramycin and the other elements, and several days may then be necessary for the complete evolution of the system to take place.

After having transformed spiramycin I into spiramycins II and III, the latter can be separated by known methods such as countercurrent distribution, chromatography on alumina or other adsorbants, or fractional crystallisation. In order to ascertain the relative proportions of the different spiramycins during the course of the transformation or at its end, it is convenient to apply the method of characterisation by paper chromatography to the transforming medium and to compare the chromatograms obtained with a control chromatogram corresponding to known quantities contained in the different spiramycins isolated in the pure state.

The following examples will serve to illustrate the invention.

Example 1

A 2-litre Erlenmeyer flask is charged with 250 cc. of the following medium:

| | | |
|---|---|---|
| Corn-steep (50% dry extract) | g | 40 |
| Glucose | g | 20 |
| Sodium chloride | g | 5 |
| Magnesium sulphate | g | 1 |
| Tap water | cc | 1000 |

The pH is adjusted to 6.8 by the addition of sodium hydroxide and the charge is completed with:

| | | |
|---|---|---|
| Calcium carbonate | g | 5 |
| Soya bean oil | cc | 4 |

This medium is sterilised for 45 minutes at 120° C. After cooling, it is seeded with a culture on agar of the strain of Streptomyces ambofaciens NRRL 2420. The culture is placed on a shaking table for 48 hours.

300 cc. Erlenmeyer flasks are charged with 50 cc. of the following medium:

| | | |
|---|---|---|
| Corn-steep (50% dry extract) | g | 35 |
| Glucose | g | 50 |
| Sodium chloride | g | 20 |
| Monopotassium phosphate | g | 2 |
| Magnesium sulphate | g | 1 |
| Tap Water | cc | 1000 |

The pH is adjusted to 6.8 with sodium hydroxide. There is then added:

| | | |
|---|---|---|
| Calcium carbonate | g | 5 |

Propionamide is then added in the proportions indicated in the table given below, which shows the results obtained.

The 300 cc. Erlenmeyer flasks and their contents are sterilised for 20 minutes at 120° C. and then, after cooling, seeded with 4 cc. of the culture from the 2-litre Erlenmeyer flasks and maintained at 25° C. on a shaking table. The quantities and the analysis of the antibiotic are carried out on the 6th, 7th and 8th days of the culture in order to determine the maximum activity and respective proportions of the three spiramycins.

| Propionamide content of the medium, g./l. | Maximum Activity, mcg./cm.³ | Proportion by weight of spiramycins (percent) | | |
|---|---|---|---|---|
| | | I | II | III |
| 0 | 285 | 51 | 26 | 23 |
| 1 | 205 | 27 | 18 | 55 |
| 2 | 175 | 24 | 10 | 66 |
| 4 | 150 | 15 | 7 | 78 |

*Example II*

A 170 litre fermentation vessel is charged with:

| | | |
|---|---|---|
| Corn-steep (50% dry extract) | kg | 4.800 |
| Glucose | kg | 2.400 |
| Sodium chloride | kg | 0.600 |
| Magnesium sulphate | kg | 0.120 |
| Tap water | litres | 100 |

The pH is adjusted to 6.8 by means of sodium hydroxide and the charge is completed with:

| | | |
|---|---|---|
| Calcium carbonate | kg | 0.600 |
| Soya bean oil | litres | 0.480 |

The medium is sterilised at 120° C. for 45 minutes. After adjustment of the temperature to 25° C. the medium is seeded with 250 cc. of a culture of *Streptomyces ambofaciens* NRRL 2420 in an agitated Erlenmeyer flask.

The culture in the fermentation vessel is aerated and agitated for 25 hours and is used to seed the productive culture. The latter is carried out in a 30 litre fermentation vessel charged with the following medium:

| | | |
|---|---|---|
| Autolysate of yeast | g | 300 |
| Glucose | g | 750 |
| Propionamide | g | 30 |
| Sodium chloride | g | 300 |
| Magnesium sulphate | g | 15 |
| Monopotassium phosphate | g | 15 |
| Tap water | litres | 16.5 |

The pH is adjusted to 6.5 with sodium hydroxide. The charge is completed with:

| | | |
|---|---|---|
| Calcium carbonate | g | 75 |
| Soya bean oil | cc | 60 |

The medium is sterilised for 40 minutes at 120° C. After cooling the volume is 15 litres and the pH is 6.8.

The medium is then seeded by the transfer of 2 litres of the inoculum culture from the 170 litre fermentation vessel, then agitated with a turbine turning at 550 r.p.m. and aerated with 1 m.³/hour of air, and maintained at 25° C.

From the commencement of the operation the pH falls to reach a value of 5–6 after 60 hours: this first phase corresponds exactly to the consumption of glucose. The pH then climbs slowly until 90 hours (6.2) and then very rapidly, passing 7 at 100 hours. The final activity of the broth is 645 mcg./cm.². The respective proportions by weight of the three spiramycins produced is as follows: I, 12%; II, 13%; III, 75%.

A similar process carried out with the same medium but without propionamide gives after 120 hours an activity of 760 mcg./cm.² with the following proportions: I, 24%; II, 53%; III, 23%.

*Example III*

The inoculum culture is produced as in Example II. The production culture is carried out this time in an 800 litre fermentation vessel charged with the following medium:

| | | |
|---|---|---|
| Starch | kg | 16.00 |
| Ammonium chloride | kg | 1.600 |
| Propionamide | kg | 1.600 |
| Potassium chloride | kg | 1.200 |
| Sodium chloride | kg | 6.800 |
| Monopotassium phosphate | kg | 2.000 |
| Magnesium sulphate | kg | 0.400 |
| Citric acid | kg | 0.400 |
| Zinc sulphate heptahydrate | g | 40 |
| Cobalt chloride hexahydrate | g | 0.12 |
| Tap water | litres | 370 |

The pH adjusted to 6.7 by the addition of sodium hydroxide (36° Bé., 1450 cc.), and the charge is completed with:

| | | |
|---|---|---|
| Calcium carbonate | kg | 2 |
| Soya bean oil | cc | 1600 |

The medium is sterilised by bubbling steam through it for 40 minutes at 120° C. After cooling, the volume is 400 litres and the pH 6.7. The medium is then seeded by a transfer of 40 litres of the inoculum culture from the 170 litre fermentation vessel, agitated with a turbine turning at 205 r.p.m., aerated with 15 m.³/hour of air and maintained at 25° C. After 150 hours of culture the activity of the broth is at its maximum: 660 mcg./cm.³. The respective proportion by weight of the three spiramycins produced is as follows: 1, 17%; II, 8%; III, 75%.

*Example IV*

A 2 litre Erlenmeyer flask is charged with 250 cc. of the following medium:

| | | |
|---|---|---|
| Corn-steep (50% dry extract) | g | 40 |
| Starch | g | 20 |
| Sodium chloride | g | 5 |
| Magnesium sulphate | g | 1 |
| Monopotassium phosphate | g | 2 |
| Tap water to make 1000 cc. | | |

The pH is adjusted to 6.8 with sodium hydroxide and calcium carbonate—5g. is added to the medium.

The medium is sterilised for 45 minutes at 120° C. After cooling, it is seeded with a culture on agar of the strain of *Streptomyces ambofaciens* NRRL 2420. The culture is agitated on a shaking table for 48 hours at 25° C.

300 cc. Erlenmeyer flasks are charged with 40 cc. of the following medium:

| | | |
|---|---|---|
| Corn-steep (50% dry extract) | g | 45 |
| Glucose | g | 50 |
| Calcium carbonate | g | 25 |
| Tap water to make 1000 cc. | | |

The pH of the medium is adjusted to 7 with sodium hydroxide. The medium is then sterilised for 30 minutes at 120° C. After cooling, the content of each Erlenmeyer flask is seeded with 4 cc. of the preceding inoculum culture. The culture is then agitated on a shaking table at 25° C. After 45 hours the fungal growth is excellent. 20 cc. of a sterile aqueous solution containing 12 g./l. of pure spiramycin I base and 6 g./l. of sodium propionate is then added to each Erlenmeyer flask. The agitation of the culture is maintained for 24 hours and then the contents of all the Erlenmeyer flasks are mixed. The chromatographic analysis of the broth shows that the latter contains 2.6 g./l. of unconverted spiramycin I and 1.4 g./l. of mixture containing 20% of spiramycin II and 80% spiramycin III.

*Example V*

300 cc. Erlenmeyer flasks are charged with 40 cc. of the following medium:

| | | |
|---|---|---|
| Yeast extract | g | 30 |
| Glucose | g | 50 |
| Calcium carbonate | g | 25 |
| Tap water to make 1000 cc. | | |

The pH of the medium is adjusted to 7 before the addition of the calcium carbonate. The medium is then sterilised for 30 minutes at 120° C. After cooling, the contents of each Erlenmeyer flask are seeded with 4 cc. of an inoculum culture prepared under the conditions of Example IV. The culture is agitated on a shaking table at 25° C. After 48 hours of development, 20 cc. of a sterile aqueous solution containing 12 g./l. of pure spiramycin I base and 6 g./l. of sodium propionate is added to each Erlenmeyer flask. The culture is allowed to incubate on the shaking table for 3 days. After this time the contents of the Erlenmeyer flasks are mixed. The chromatographic analysis of the culture broth shows that it now contains 2.1 g./l. of unconverted spiramycin I and 1.9 g./l. of spiramycin I converted into a mixture containing 6% of spiramycin II and 94% of spiramycin III.

*Example VI*

300 cc. Erlenmeyer flasks are harged with 40 cc. of the following medium:

Ammonium chloride _____ g__ 6
Glucose _____ g__ 25
Calcium carbonate _____ g__ 20
Tap water _____ cc__ 1000

These Erlenmeyer flasks are sterilised, seeded and cultivated under the conditions described in Example V. After 48 hours of culture 20 cc. of a sterile aqueous solution containing 9 g./l. of pure spiramycin I base and 21 g./l. of propionamide is added to each Erlenmeyer flask.

After three days of incubation the chromatographic analysis of the broth shows that 1.86 g./l. of spiramycin I has been converted into a mixture of 55% of spiramycin II and 45% of spiramycin III. There remains 1.14 g./l. of unconverted spiramycin I.

*Example VII*

A culture of *Streptomyces ambofaciens* NRRL 2420 is carried out under the conditions described in Example VI. The solution which contains spiramycin base contains in addition 6 g./l. of sodium propionate. It is found after paper chromatography of the culture broth that there remains 0.96 g./l. of unconverted spiramycin I and that 2.04 g./l. of spiramycin I has been converted into a mixture containing 11% of spiramycin II and 89% of spiramycin III.

*Example VIII*

300 cc. Erlenmeyer flasks are charged with 40 cc. of the following medium:

Ammonium chloride _____ g__ 10
Glucose _____ g__ 50
Calcium carbonate _____ g__ 25
Tap water _____ cc__ 1000

These Erlenmeyer flasks are sterilised, seeded and cultivated under the conditions described in Example V. After 48 hours of culture 20 cc. of a sterile aqueous solution containing 12 g./l. of pure spiramycin I base and 6 g./l. of sodium propionate is added to each Erlenmeyer flask. The Erlenmeyer flasks are then divided into 4 groups. The first group remains as it is; to the other three groups are added respectively magnesium sulphate, ferrous sulphate and cobalt chloride. The addition of these salts is such that each metal occurs in a concentration of 1 millimole per litre in the transformation medium. After three days of incubation the Erlenmeyer flasks of each group are mixed and their contents are analysed by paper chromatography. The results of the analysis are as follows:

| Activator | Quantity of Spiramycin I transformed (g./l.) | Proportion of Spiramycins (percent) | |
|---|---|---|---|
| | | II | III |
| 0 | 1.88 | 21 | 79 |
| Magnesium | 2.12 | 28 | 72 |
| Iron | 2.32 | 30 | 70 |
| Cobalt | 2.80 | 27 | 73 |

*Example IX*

300 cc. Erlenmeyer flasks are charged, sterilised, seeded and cultivated under the conditions described in Example VIII. After 48 hours of culture the Erlenmeyer flasks are divided into two groups. Each Erlenmeyer flask of the first group receives 20 cc. of the aqueous solution containing 12 g./l. of pure spiramycin I base and 6 g./l. of sodium propionate. Each Erlenmeyer flask of the second group receives 20 cc. of the same solution to which has been added 30 g./l. of sodium chloride. Each group of the Erlenmeyer flasks is treated as above and the results of chromatographic analysis are as follows:

| NaCl (g./l.) | Quantity of spiramycin I transformed (g./l.) | Proportion of spiramycins (percent) | |
|---|---|---|---|
| | | II | III |
| 0 | 1.88 | 21 | 79 |
| 10 | 2.60 | 23 | 77 |

*Example X*

300 cc. Erlenmeyer flasks are charged with 50 cc. of the following medium:

Ammonium chloride _____ g__ 10
Glucose _____ g__ 50
Calcium carbonate _____ g__ 25
Tap water to make 1000 cc.

The Erlenmeyer flasks are sterilised, seeded and cultivated under the conditions described in Example V.

After 52 hours of culture each Erlenmeyer flask receives 1 cc. of a 15% solution of sodium propionate. The Erlenmeyer flasks are then divided into two groups. Each Erlenmeyer flask of the first group receives 2 cc. of a 15% solution of pure spiramycin I base in methanol. Each Erlenmeyer flask of the second group receives a solution of the same composition but in acetone. The culture is allowed to incubate for 72 hours on the shaking table. The contents of the Erlenmeyer flasks of the same group are combined and analysed chromatographically. The results of the transformation are the following:

| Solvent | Quantity of spiramycin I transformed (g./l.) | Proportion of spiramycins (percent) | |
|---|---|---|---|
| | | II | III |
| methanol | 3.48 | 24 | 76 |
| acetone | 3.36 | 27 | 73 |

*Example XI*

300 cc. Erlenmeyer flasks are charged as in the preceding Example, sterilised for 30 minutes at 120° C. and each seeded with 6 cc. of an inoculum culture prepared as described in Example IV. The Erlenmeyer flasks are incubated on a shaking table at 25° C. and then are divided into three groups. After 48 hours of culture each Erlenmeyer flask of the first group receives 2 cc. of a 15% solution in methanol of pure spiramycin I base and 1 cc. of a 15% aqueous solution of sodium propionate. The same additions are made to each of the Erlenmeyer flasks of the two other groups but after 72 and 96 hours of culture respectively. The culture is in each case continued for 3 days after the addition of spiramycin. The contents of the Erlenmeyer flasks of the same group are analysed by paper chromatography. The following table shows the results of the analysis.

| Addition of spiramycin, hours | Quantity of spiramycin I transformed (g./l.) | Proportion of spiramycins (percent) | |
|---|---|---|---|
| | | II | III |
| 48 | 3.00 | 16 | 84 |
| 72 | 3.06 | 18 | 82 |
| 96 | 1.62 | 28 | 72 |

*Example XII*

300 cc. Erlenmeyer flasks are charged with 50 cc. of the following medium:

| | | |
|---|---|---|
| Ammonium nitrate | g-- | 13 |
| Glucose | g-- | 50 |
| Calcium carbonate | g-- | 25 |
| Tap water to make 1000 cc. | | |

The Erlenmeyer flasks are sterilised for 30 minutes at 120° C., cooled and seeded with 5 cc. of inoculum culture, the preparation of which is described in Example IV. After three days of culture at 25° C. on a shaking table, 5 cc. of an aqueous solution, containing 100 g./l. of pure spiramycin I base, propionic acid 38 g./l. cobalt chloride hexahydrate 10 g./l. and the pH of which has been adjusted to 6.5 by the addition of sodium hydroxide, is added to each Erlenmeyer flask. The culture is allowed to proceed for 3 further days and the contents of the Erlenmeyer flasks are analysed by paper chromatography. 8.7 g./l. of spiramycin I has been transformed into a mixture containing 9% of spiramycin II and 91% of spiramycin III.

*Example XIII*

300 cc. Erlenmeyer flasks are charged with 50 cc. of the following medium:

| | | |
|---|---|---|
| Ammonium nitrate | g-- | 20 |
| Starch | g-- | 60 |
| Calcium carbonate | g-- | 25 |
| Calcium carbonate | g-- | 25 |
| Tap water to make 1000 cc. | | |

The Erlenmeyer flasks are sterilised, seeded and incubated under the conditions described in Example V. After 96 hours of culture, 5 cc. of an aqueous solution, containing 140 g./l. of a crude spiramycin base (containing respectively 59, 27 and 14% of spiramycins I, II and III), 56 g./l. propionic acid, 0.5 g./l. of cobalt chloride hexahydrate and of which the pH was adjusted to 6.5 with sodium hydroxide, is added to each Erlenmeyer flask. The culture is allowed to continue for three days and the contents of the Erlenmeyer flasks analysed chromatographically. Of the 8.26 g./l. of spiramycin I added, 6.3 g./l. had been converted to a mixture containing 13% of spiramycin II and 87% of spiramycin III.

*Example XIV*

Two 300 cc. Erlenmeyer flasks are charged with 50 cc. of the following medium:

| | | |
|---|---|---|
| Ammonium chloride | g-- | 10 |
| Glucose | g-- | 50 |
| Calcium carbonate | g-- | 25 |
| Tap water to make 1000 cc. | | |

The Erlenmeyer flasks are sterilised, seeded and incubated under the conditions described in Example V. After 72 hours of culture the contents of the Erlenmeyer flasks are centrifuged and the supernatant liquid removed. Half the centrifuged mass is suspended in 50 cc. of an aqueous solution placed in a 300 cc. Erlenmeyer flask and containing 6 g./l. of pure spiramycin I base, 2.3 g./l. propionic acid, 1 g./l. of cobalt chloride hexahydrate, the pH of the said solution being adjusted to 6.5 by the addition of sodium hydroxide. The other half of the centrifuged mass is suspended in 50 cc. of the aqueous solution of the same composition but containing in addition 10 g./l. of glucose.

The two Erlenmeyer flasks containing the suspension of mycelium are incubated at 25° C. on a shaking table for two days. After this time the contents of each of the Erlenmeyer flasks is analysed by chromatography. The results of the transformation are as follows:

| | Quantity of spiramycin I transformed (g./l.) | Proportion of spiramycins (percent) | |
|---|---|---|---|
| | | II | III |
| Without glucose | 2.22 | 14 | 86 |
| With glucose | 3.70 | 14 | 86 |

A 300 cc. Erlenmeyer flask is charged with 50 cc. of the following medium:

| | | |
|---|---|---|
| Ammonium chloride | g-- | 10 |
| Glucose | g-- | 50 |
| Calcium carbonate | g-- | 25 |
| Tap water | cc-- | 1000 |

The Erlenmeyer flask is sterilised, seeded and incubated under the conditions described in Example V. After 72 hours of culture the contents of the Erlenmeyer flask are centrifuged and the supernatant liquid is eliminated. The centrifuged mass is suspended in 50 cc. of a buffer solution in a 300 cc. Erlenmeyer flask, this buffer solution containing 9.85 g./l. of glacial acetic acid and 4.9 g./l. of sodium acetate. The pH is 4. It contains in addition 6.45 g./l. of pure spiramycin I hydrochloride and 1 g./l. of cobalt chloride hexahydrate. The Erlenmeyer flask containing the suspension of mycelium is incubated at 25° C. on a shaking table for 80 hours. The contents of the Erlenmeyer flask are then analysed by paper chromatography. It is thus found that 2.40 g./l. of spiramycin I have been converted into a mixture containing 90% of spiramycin II and 10% of spiramycin III.

*Example XVI*

There are placed successively into a 170 litre fermentation vessel:

| | | |
|---|---|---|
| Corn-steep (50% dry extract) | g-- | 4800 |
| Starch | g-- | 2400 |
| Sodium chloride | g-- | 600 |
| Magnesium sulphate | g-- | 120 |
| Monopotassium phosphate | g-- | 240 |
| Tap water | litres-- | 100 |

The pH is adjusted to 6.7 with 750 cc. of sodium hydroxide solution (400 g./l. NaOH). There are then added:

| | | |
|---|---|---|
| Calcium carbonate | g-- | 600 |
| Soya bean oil | cc-- | 60 |
| Silicone anti-foaming agent | cc-- | 60 |

The fermentation vessel and its contents are sterilised by a passage of steam for 40 minutes at 122° C., which produces a final volume of 120 litres. After cooling and adjusting the temperature to 25° C., the fermentation vessel is seeded with 250 cc. of an inoculum culture prepared as has been described in Example IV. The medium is then agitated by a helix turning at 350 r.p.m. and aerated with 5 cubic meters of air per hour. After 23 hours of culture the development of *Streptomyces ambofaciens* NRRL 2420 is abundant.

A 30 litre fermentation vessel is then charged with the following:

| | | |
|---|---|---|
| Ammonium chloride | g-- | 150 |
| Glucose hydrate | g-- | 750 |
| Tap water | litres-- | 14 |

The fermentation vessel and its contents are sterilised for 40 minutes at 122° C. After cooling and adjusting the temperature to 25° C., 375 g. of calcium carbonate is added in sterile suspension in 2 litres of water which produces a volume of the medium of 15 litres. The pH is then 7.5.

The medium is seeded with 1.5 litres of inoculum culture from the 170 litre fermentation vessel previously described and allowed to stand for 23 hours. The medium is agitated with a helix turning at 550 r.p.m. and aerated at a rate of 1 cubic metre of air per hour. After 48 hours of culture a good development of *Streptomyces ambofaciens* NRRL 2420 is present and the culture medium has a pH of 6.5. An aqueous solution composed of:

| | | |
|---|---|---|
| Spiramycin base | g | 150 |
| Sodium propionate | g | 19 |
| Cobalt chloride hexahydrate | g | 17 |
| N propionic acid solution | cc | 300 |
| Distilled water | cc | 1000 | is added to the medium.

The spiramycin base used is a crude product which contains respectively 65, 23 and 12% of spiramycins I, II and III.

The culture is then continued under the same conditions of temperature, agitation and aeration for 90 hours. The fermentation vessel is then emptied and 13.75 litres of broth obtained. Paper chromatography of the broth showed that all the spiramycin I had been converted into a mixture of spiramycins II and III, the proportions respectively being 29 and 71% of the final product. Extraction of the broth produces 122 g. of spiramycin base composed of 25% and 75% of spiramycins II and III, respectively.

This application is a division of application Serial No. 727,765, filed April 11, 1958.

We claim:

1. A process for the production of an antibiotic consisting predominantly of spiramycin II which comprises culturing *Streptomyces ambofaciens* NRRL 2420 under aerobic conditions on a nutrient culture medium in the presence of an acetylating agent selected from the class consisting of acetic acid, acetic acid salts, acetic acid ester, acetamide and butyric acid which is added to the said medium.

2. A process for the production of an antibiotic consisting predominantly of spiramycin II which comprises culturing *Streptomyces ambofaciens* NRRL 2420 under aerobic conditions on a nutrient culture medium containing a glucidic source of energy, a source of ammoniacal nitrogen and an alkaline substance to hold the pH to values between pH 5 and pH 9 in the presence of an acetylating agent selected from the class consisting of acetic acid, acetic acid salts, acetic acid esters, acetamide, and butyric acid which is added to the said medium.

3. A process for the production of an antibiotic consisting predominantly of spiramycin II which comprises culturing *Streptomyces ambofaciens* NRRL 2420 under aerobic conditions at 20–35° C. on a nutrient culture medium in the presence of an acetylating agent selected from the class consisting of acetic acid, acetic acid salts, acetic acid esters, acetamide, and butyric acid which is added to the said medium.

4. A process for the production of an antibiotic consisting predominantly of spiramycin II which comprises culturing *Streptomyces ambofaciens* NRRL 2420 under aerobic conditions on a nutrient culture medium in the presence of an acetylating agent selected from the class consisting of acetic acid, acetic acid salts, acetic acid esters, acetamide, and butyric acid which is added to the said medium and in the presence of a metal chloride.

5. A process for the production of an antibiotic consisting predominantly of spiramycin II which comprises culturing *Streptomyces ambofaciens* NRRL 2420 under aerobic conditions on a nutrient culture medium in the presence of an acetylating agent selected from the class consisting of acetic acid, acetic acid salts, acetic acid esters, acetamide, and butyric acid which is added to the said medium and in the presence of an activator selected from the class consisting of salts of magnesium, iron and cobalt.

6. A process for the production of an antibiotic consisting predominantly of spiramycin II which comprises culturing *Streptomyces ambofaciens* NRRL 2420 under aerobic conditions on a nutrient medium initially free from spiramycin and from any added acylating agent, using said culture as an inoculum culture to seed a second nutrient medium containing spiramycin I and an acetylating agent selected from the class consisting of acetic acid, acetic acid salts, acetic acid esters, acetamide, and butyric acid, and continuing the culture.

7. A process for the production of an antibiotic consisting predominantly of spiramycin II which comprises culturing *Streptomyces ambofaciens* NRRL 2420 under aerobic conditions on a nutrient medium initially free from spiramycin and from any added acylating agent, using said culture as an inoculum culture to seed a second nutrient medium containing a glucidic source of energy, a source of ammoniacal nitrogen and an alkaline substance to hold the pH to values between pH 5 and pH 9 containing spiramycin I and an acetylating agent selected from the class consisting of acetic acid, acetic acid salts, acetic acid esters, acetamide, and butyric acid, and continuing the culture.

8. A process for the production of an antibiotic consisting predominantly of spiramycin II which comprises culturing *Streptomyces ambofaciens* NRRL 2420 under aerobic conditions on a nutrient medium initially free from spiramycin and from any added acylating agent, using said culture as an inoculum culture to seed a second nutrient medium containing spiramycin I and an acetylating agent selected from the class consisting of acetic acid, acetic acid salts, acetic acid esters, acetamide, and butyric acid, and continuing the culture under aerobic conditions at 20–35° C.

9. A process for the production of an antibiotic consisting predominantly of spiramycin II which comprises culturing *Streptomyces ambofaciens* NRRL 2420 under aerobic conditions on a nutrient medium initially free from spiramycin and from any added acylating agent, using said culture as an inoculum culture to seed a second nutrient medium containing spiramycin I and an acetylating agent selected from the class consisting of acetic acid, acetic acid salts, acetic acid esters, acetamide and butyric acid and further containing a metal chloride and continuing the culture.

10. A process for the production of an antibiotic consisting predominantly of spiramycin II which comprises culturing *Streptomyces ambofaciens* NRRL 2420 under aerobic conditions on a nutrient medium initially free from spiramycin and from any added acylating agent, using said culture as an inoculum culture to seed a second nutrient medium containing spiramycin I and an acetylating agent selected from the class consisting of acetic acid, acetic acid salts, acetic acid esters, acetamide, and butyric acid and further containing an activator selected from the class consisting of salts of magnesium, iron and cobalt and continuing the culture.

11. A process for the production of an antibiotic consisting predominantly of spiramycin II which comprises culturing *Streptomyces ambofaciens* NRRL 2420 under aerobic conditions on a nutrient medium initially free from spiramycin and from any added acylating agent, separating the mycelium from said culture, using said mycelium as an inoculum culture to seed a second nutrient medium containing spiramycin I and an acetylating agent selected from the class consisting of acetic acid, acetic acid salts, acetic acid esters, acetamide, and butyric acid and continuing the culture.

12. A process for the production of an antibiotic consisting predominantly of spiramycin II which comprises culturing *Streptomyces ambofaciens* NRRL 2420 under aerobic conditions on a nutrient medium initially free from spiramycin and from any added acylating agent, separating the mycelium from said culture, using said mycelium as an inoculum culture to seed a second nutrient medium containing a glucidic source of energy, a source of ammoniacal nitrogen and an alkaline substance to hold the pH to values between pH 5 and pH 9 and containing spiramycin I and an acetylating agent selected from the class consisting of acetic acid, acetic acid salts, acetic acid esters, acetamide, and butyric acid and continuing the culture.

13. A process for the production of an antibiotic consisting predominantly of spiramycin II which comprises culturing Streptomyces ambofaciens NRRL 2420 under aerobic conditions on a nutrient medium initially free from spiramycin and from any added acylating agent, separating the mycelium from said culture, using said mycelium as an inoculum culture to seed a second nutrient medium containing spiramycin I and an acetylating agent selected from the class consisting of acetic acid, acetic acid salts, acetic acid esters, acetamide, and butyric acid and continuing the culture under aerobic conditions at 20–35° C.

14. A process for the production of an antibiotic consisting predominantly of spiramycin II which comprises culturing Streptomyces ambofaciens NRRL 2420 under aerobic conditions on a nutrient medium initially free from spiramycin and from any added acylating agent, separating the mycelium from said culture, using said mycelium as an inoculum culture to seed a second nutrient medium containing spiramycin I and an acetylating agent selected from the class consisting of acetic acid, acetic acid salts, acetic acid esters, acetamide, and butyric acid and further containing a metal chloride, and continuing the culture.

15. A process for the production of an antibiotic consisting predominantly of spiramycin II which comprises culturing Streptomyces ambofaciens NRRL 2420 under aerobic conditions on a nutrient medium initially free from spiramycin and from any added acylating agent, separating the mycelium from said culture, using said mycelium as an inoculum culture to seed a second nutrient medium containing spiramycin I and an acetylating agent selected from the class consisting of acetic acid, acetic acid salts, acetic acid esters, acetamide, and butyric acid and further containing an activator selected from the class consisting of salts of magnesium, iron and cobalt, and continuing the culture.

16. A process for the production of an antibiotic consisting predominantly of spiramycin II which comprises culturing Streptomyces ambofaciens NRRL 2420 under aerobic conditions at 20–35° C. on a nutrient medium initially free from spiramycin and from any acylating agent, using the said culture as an inoculum culture to seed a second nutrient medium which includes a glucidic source of energy, a source of ammoniacal nitrogen, an alkaline substance to hold the pH to values between pH 6.5 and 7.5, a metal chloride, an activator selected from the class consisting of salts of magnesium iron and cobalt, spiramycin I and an acetylating agent selected from the class consisting of acetic acid, acetic acid salts, acetic acid esters, acetamide, and butyric acid and continuing the culture under aerobic conditions at 20–35° C.

No references cited.